Aug. 31, 1965    H. WEST    3,203,666
BLADED ROTOR CONSTRUCTION
Filed Nov. 23, 1962    2 Sheets-Sheet 1
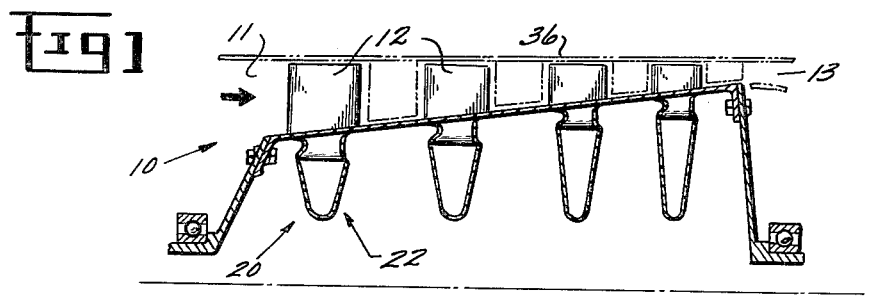
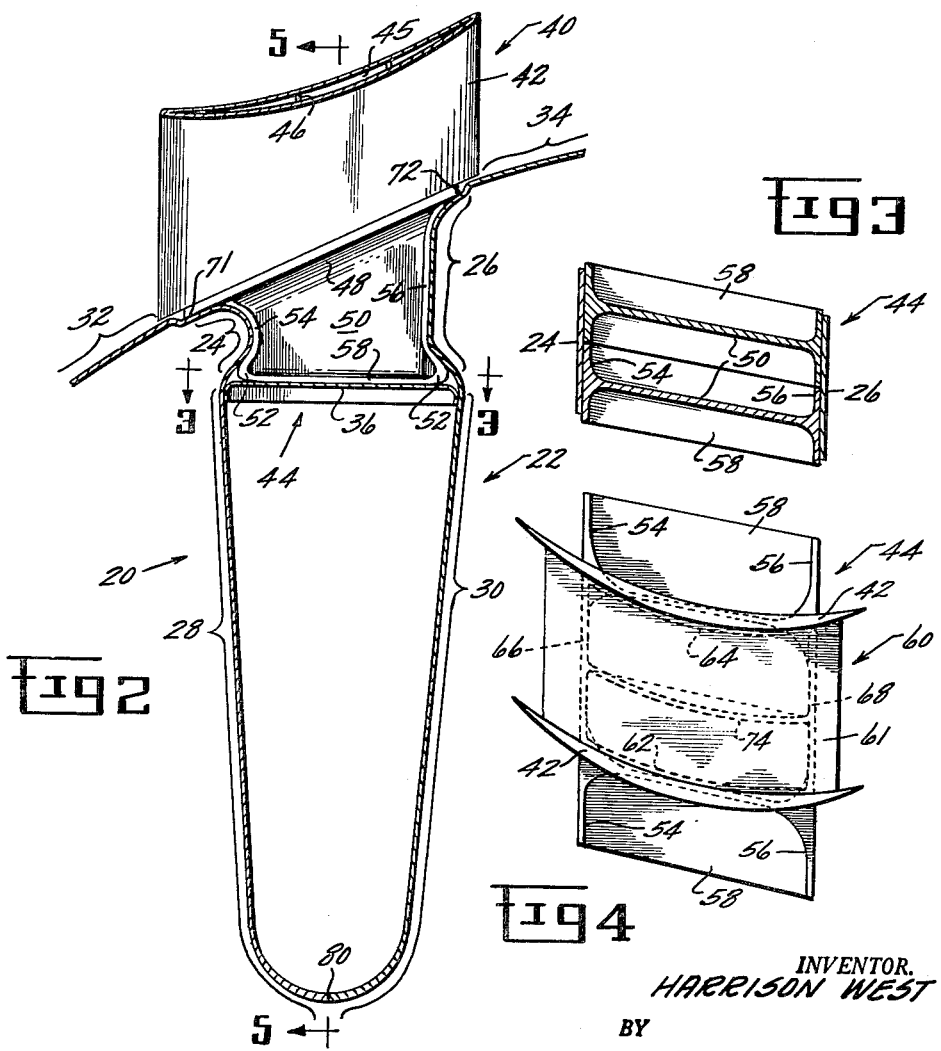
INVENTOR.
HARRISON WEST
BY
Harry C. Burgess
ATTORNEY

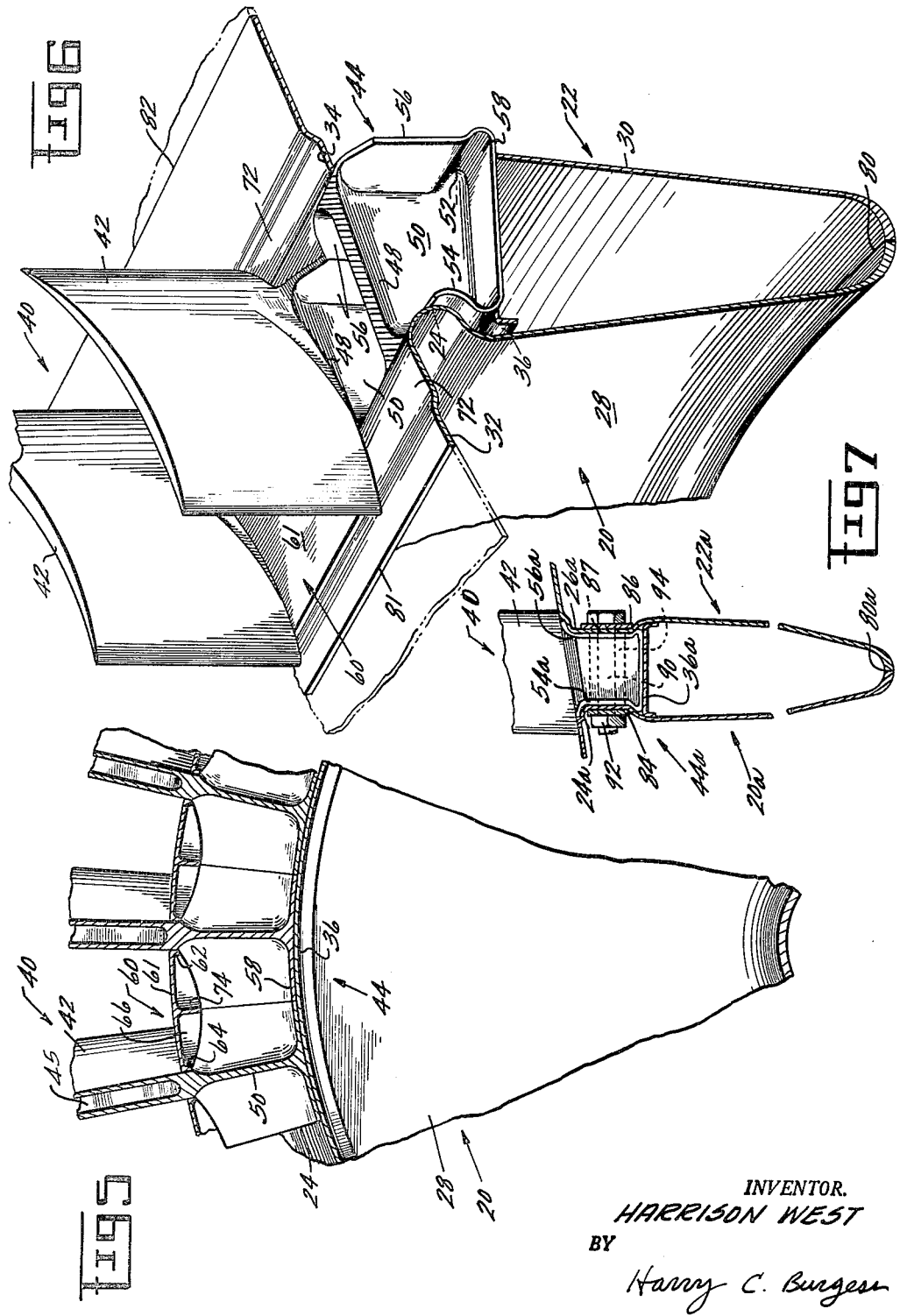

3,203,666
BLADED ROTOR CONSTRUCTION
Harrison West, Cincinnati, Ohio, assignor to General
Electric Company, a corporation of New York
Filed Nov. 23, 1962, Ser. No. 239,524
3 Claims. (Cl. 253—39)

This invention relates to a bladed rotor construction and, more particularly, to a lightweight rotor, partially or completely fabricated from sheet-metal, having optimized airfoil (blade) load carrying and load transmitting characteristics together with a relatively high percentage, by weight, of aerodynamically functional supporting structure.

Recently, impetus has been given to the search for lighter and more efficient turbomachines designed for use in aircraft. The primary reason for this has been the increased demand for more powerful gas turbine engines, for use in advanced high-Mach aircraft, without a corresponding gain in engine weight. In such advanced engine applications the rotor structures will, of course, operate under higher loads, stresses, and temperatures. Generally, a gas turbine rotor in an aircraft will be subjected to large centrifugal, gyroscopic, and torsional loads, as well as loads induced by temperature differentials between adjacent parts of the engine. Attempts which have been made to improve the design of lightweight engines have included the use of components such as, for example, compressors, made largely of sheet-metal. In the case of axial-flow compressor rotors constructed of sheet-metal one answer to the problem of lightweight design has been the drum-type or hollow rotor usually having no internal shaft but utilizing a series of rigidly constructed axially-spaced disks to support the blades, or airfoils. Such a structure is shown and described in the patent to Paulson, 2,922,618, of common assignment. Some room for improvement over the prior art construction still exists, however, particularly in the areas of airfoil load carrying and load transmission capability and reduction of "dead" weight, i.e., support structure which is non-functional aerodynamically. Improvement would be especially desirable in the case of high-Mach engine rotors using very light, hollow airfoils of low aspect ratio where rim rotation moments due to high gas and gyroscopic loadings can be very significant.

Accordingly, a general object of the present invention is to provide an improved lightweight, sheet-metal, drum-type rotor construction.

A more specific object is to provide a lightweight rotor construction having a relatively high percentage of "live" or self-supporting structure and improved load carrying and load transmission characteristics for airfoils of the high energy, low aspect ratio, transonic and supersonic variety.

Briefly, one embodiment of my invention comprises an axial-flow rotor fabricated from a plurality of axially arranged annular sheet-metal pieces each having a first portion forming part of a flow path boundary wall and a second portion forming a rotor disk in cooperation with the second portion of an adjacent piece, the adjacent annular pieces being joined by a cylindrical support member inserted therebetween. A plurality of blade members are located between the disk forming portions of adjacent annular pieces outwardly of the support member with adjacent blade members being spaced by platform members cooperating with the first portions of the annular pieces to complete the flow path boundary wall. The described parts of the rotor are preferably joined by advanced fabricating techniques, such as electron beam welding, to take full advantage of the reduction in weight—without consequent loss in strength—made possible with use of the invention described herein.

My invention will be better understood, and other objects and attendant advantages be made more clear, from the following detailed description when read in conjunction with the accompanying drawings in which:

FIGURE 1 is a side view, partially in cross-section, of a turbomachine compressor rotor constructed according to the invention;

FIGURE 2 is an enlarged cross-sectional view of a fully fabricated embodiment of a single stage of the rotor of FIGURE 1;

FIGURE 3 is a cross-sectional view along line 3—3 of FIGURE 2;

FIGURE 4 is a top plan view of the rotor illustrating a platform element located between adjacent blade airfoils;

FIGURE 5 is a view along line 5—5 of FIGURE 2;

FIGURE 6 is a partial perspective view of the parts necessary to fabricate a single stage of the rotor shown in FIGURE 1; and FIGURE 7 is a further embodiment of the invention featuring a partially fabricated rotor stage.

While the invention is described using an axial-flow jet engine compressor rotor for purposes of illustration, it will be appreciated that the invention is equally applicable to a single or multi-stage turbine rotor. Referring now specifically to FIGURE 1, shown therein is a compressor rotor indicated generally at 10 adapted to receive air to be compressed at air inlet end 11, as shown by the large arrow. The air is compressed as it passes through the compressor stages, or rows of blading 12, which are four in number in this instance, the air exhausting at 13 to a typical jet engine combustion section (not shown).

Each rotor stage will be seen from the drawings, in particular FIGURES 1 and 2, to comprise a first, or forward rotor drum piece, indicated generally at 20, and a second, or rearward rotor drum piece, indicated generally at 22. The rotor drum pieces 20 and 22 have, respectively, load transition sections 24 and 26, and web, or disk sections 28 and 30, extending radially inwardly toward the rotor axis. The axially-extending portions 32 and 34, respectively, of the forward and rearward drum pieces, it will be noted, form part of the inner boundary wall of the flow path through the turbomachine. The outer boundary wall, on the other hand, consists of the stator casing 36, illustrated in phantom in FIGURE 1. Located at the juncture of the load transition section and web, or disk section of the rotor drum pieces of each stage is a cylindrical support member 36. The support member also serves as a tensioning member in the completed assembly, as described hereinbelow.

In the fully fabricated rotor assembly shown in FIGURES 1–6, the fully fabricated stages are permanently joined together, being separated only for repair of the rotor. In this embodiment, each rotor stage or blade row includes a number of circumferentially spaced blade members indicated at 40, each blade member having an airfoil section 42 and a shank section, indicated generally at 44. For maximum weight reduction the airfoil section of the blades may be hollow having a cavity 45 with stiffeners 46, as shown in the drawings. As shown, the blades have the low aspect ratio (ratio of span to chord length) typical of transonic and supersonic engine compressors. The shank section of each blade may be cold-formed, or may comprise a thin-walled casting which can be integral with the airfoil, if the latter is not hollow. In any event, each shank 44 has a thickened blade joining portion 48, a web portion 50, a circumferential dovetail, or boot 52, a pair of axially-spaced end flanges 54 and 56, respectively, and a circumferential bottom (dovetail) flange 58. In the described embodiment, each rotor stage assembly is completed by a platform or spacer element, indicated generally at 60. The platform elements, which are adapted to fit between adjacent blade member airfoil sections, include a surface or wall portion 61 and dependent circumferentially-spaced side flanges 62 and 64, which are so configured or curved with regard to their respective airfoil surfaces as to closely abut the surfaces throughout the axial lengths of the flanges. In addition, the platform elements include axially-spaced curvilinear end flanges or sides 66 and 68 adapted to rest atop of the abutting end flanges 54 and 56 of adjacent shanks 44, while also substantially overlying indented portions 71 and 72, also respectively, of the axial portions of the first and second annular rotor drum pieces. A central stiffening rib 74 may also be provided to brace the platform element.

It will be realized from the above description that the invention is aimed at improving the design and fabrication of lightweight sheet-metal type rotors from several standpoints. One problem is how to best support the unusually long chord (low aspect ratio) blades having the aforementioned high loadings. The invention proposes a solution to this problem, first, by use of double webbed disks integrally formed with the rotor drum surfaces. Thin-walled metal sheets are cold rolled or ground to thickness and then formed (e.g., explosively) into the annular drum pieces 20 and 22. In this way a constant or a variable thickness disk wall may be provided. In addition, as shown in FIGURE 2, the webs or disk portions may be normal to or angled from a plane perpendicular to the rotor axis, depending on the desired stress concentration at the load transition section, the force of the web recovery moment desired (if any), and the web separation spring constant necessary at the load transition area (in the case of the removable blade embodiment hereinafter described and shown in FIGURE 7). The rotor drum pieces 20 and 22 are then joined at the center bore area 80, after accurate face grinding and mating operations have been performed, a feature which enables the bore area stresses to be minimized.

The second feature relating to the airfoil (blade member) load transmission problem involves the "box-like" rotor drum rim structure provided with use of the described configuration. To explain, it will be realized that once the disk is formed by the mated rotor drum pieces and the cylindrical support member attached (e.g., by electron beam welding) at one edge to the juncture of the load transition and web sections of one of the drum pieces, the "sprung" disk webs present a roughly fixtured preliminary stage assembly. If the blade members are then inserted into the space between the load transition sections 24–26, the parts may be welded—or brazed—first along the pairs of matching, abutting surfaces comprising (1) the inner surface of the load transition section 24 and the shank end flanges 54 and (2) the circumferential bottom flanges 58 and the top of the support member 36 (the bottom and side flanges of adjacent blade members having been preferably joined prior to insertion in the box, although this is not absolutely necessary with such advanced fabricating techniques as electron beam welding). While this assembly is still fixtured, the other edge of the support element 36 and the opposite shank end flanges 56 are then permanently affixed to the rearward rotor drum piece transition section inner surface and the platform elements 60 dropped into place and likewise welded or brazed to the airfoils 42 and to the drum pieces at 71 and 72. The assembled stages may then be placed in a fixture and joined at 81 and 82 (FIGURE 6) to form a drum-type rotor 10.

FIGURE 7 illustrates an alternate embodiment wherein a partially fabricated rotor stage is preferred. In this example annular rotor drum pieces 20a and 22a, as before, are joined at a central bore area 80a and by a cylindrical support member 36a. The blade shanks 44a are inserted, as in the previous embodiment. However, instead of brazing, or welding the shank flanges to the annular pieces a pair of rings 84 and 86 are provided on the outside of the rim or load transition "box," the rings including holes 87 adapted to be aligned with like holes 88 provided in the walls of the load transition sections 24a and 26a, the holes being located along the joint between the shank end flanges 54a and 56a. With the blade member shanks and the rings in place, the assembly is completed by means of fasteners, such as the threaded bolts 90 extending through the aligned holes and engaged with nuts 92. Obviously, other fastening means, such as rivets would suffice. If necessary, sleeves 94 may be provided inside the "box" or load transition section to brace the sheet-metal structure.

A fundamental feature of the above-described invention that differs from previous rotor structures is the optimization of blade member support by the interaction of four mechanisms or structural arrangements, namely: (1) the joined blade bottom flanges, in effect, constitute a continuous circumferential dovetail; (2) the maximum use of structures in tension, i.e., the disk or web sections, the axially-spaced shank end flanges 54 and 56, and the support member 36 are all essentially continuous structures in the circumferential direction, in addition to the fact that with the described "box" structure, the airfoils themselves are in tension along their chord lengths while the platform elements double as tension members (note that, in contrast to most prior art sheet-metal rotor fabrications, a shear strength is only a secondary, rather than a major source of fabrication strength); (3) the airfoil or blade member load is transmitted from the dovetail, or flared shank portion 52 directly to the web or disk sections through a single joint, rather than two or more, as in previous less efficient designs; and (4) the described structure embodies a much higher content of "live" or self-supporting structure—the circumferential non-segmented disks, platform elements, support ring, and circumferential dovetail—than is the case with the conventional serrated, relatively massive disk rim construction utilized in many of the previous rotor designs. Finally, it should be clear that the use of sheet-metal to perform double duty, i.e., functional as well as purely supporting structure, in a fabricated rotor design will provide for more efficient, less costly, advanced lightweight turbomachine components.

Other embodiments and modifications of the described embodiment as are within the skill of the art are intended to be covered by the appended claims.

What I claim as new and novel is:

1. A lightweight axial-flow bladed turbomachine rotor comprising:

a plurality of annular sheet-metal rotor drum pieces, each piece having an axially-extending portion forming part of the drum surface and flow path boundary wall through the turbomachine and an integral radially-extended portion, the latter portion including a load transition section adjacent the drum surface and an inner web section wherein said drum pieces are attached to each other at the inward extremities of the web sections to form a hollow disk;

a plurality of blade members, each blade member including an airfoil and a shank, said shank having a circumferentially-extending dovetail portion and a pair of axially-spaced generally radial flanges, said blade member shanks being located between the radially-extending portions of adjacent drum pieces with said axially spaced flanges being in abutting attachment with their respective load transition sections;

and a plurality of platform elements each having a surface wall portion, a first pair of curvilinear flanges in mating abutment with adjacent airfoils and a second pair of curvilinear flanges overlying part of the axially-extending portions of the adjacent drum pieces, said axially-extending drum-piece portions cooperating with said platform surface wall portions to complete the said turbomachine flow path boundary wall.

2. A lightweight axial-flow bladed turbomachine rotor comprising:

a plurality of annular members each having an axially-extending portion and an integral radially-extending portion, said radially-extending portion including a load transition section and an inner web section;

a hollow cylindrical support member attached at opposite edges to adjacent annular members, said annular members also being attached to each other inwardly of said support member to form a hollow disk;

a plurality of blade members each including an airfoil and a shank, said shank having a circumferentially-extending dovetail portion and a pair of axially-spaced generally radial flanges, said dovetail portions resting on said support member and said axially-spaced flanges being in abutment with opposing load transition sections;

and a plurality of platform elements each having a surface wall portion, a first pair of curvilinear edge flanges in mating abutment with adjacent airfoils, and a second pair of curvilinear edge flanges overlying part of the axially-extending portions of adjacent annular members, said platform element surface wall portions and said drum-piece axially-extending portions cooperating to form a flow path boundary wall for said turbomachine.

3. A lightweight axial-flow turbomachine rotor comprising:

a plurality of annular sheet-metal rotor drum pieces, each piece having an axially-extending portion forming part of the drum surface and flow path boundary wall through the turbomachine and an integral radially-extending portion, the latter portion including a load transition section adjacent the drum surface and an inner web section;

a hollow cylindrical support member, said member being attached at one edge to a first rotor drum piece adjacent the junction of the load transition section and the web section and at the opposite edge to a second rotor drum piece in a like manner, said drum pieces also being attached to each other at the inward extremities of the web sections to form a hollow disk;

a plurality of blade members, each blade member including an airfoil and a shank, said shank having a circumferentially-extending dovetail portion and a pair of axially-spaced, radially-extending flange portions;

and a plurality of platform elements, each platform element having a surface wall portion, a pair of circumferentially-spaced curvilinear edge flanges in mating abutment with adjacent blade member airfoils and a pair of axially-spaced curvilinear edge flanges, wherein the blade member shanks are located between the load transition sections of adjacent drum pieces with the dovetail portions resting on said support member and said axially-spaced radially-extending flange portions in abutment with their respective load transition sections, and said platform surface wall portions and said axially-spaced curvilinear edge flanges partially overlie each of the axially-extending portions of adjacent drum pieces to complete the said turbomachine flow path boundary wall.

References Cited by the Examiner

UNITED STATES PATENTS

| 2,749,028 | 6/56 | Stalker | 253—77 |
| 2,819,870 | 1/58 | Wayne | 253—39.1 |
| 2,925,250 | 2/60 | Whitehead | 253—77 |
| 2,931,621 | 4/60 | O'Donnell | 253—77 |
| 3,014,691 | 12/61 | Stalker | 253—39 |

KARL J. ALBRECHT, *Primary Examiner.*

BENJAMIN A. BORCHELT, *Examiner.*